(No Model.)
G. SPENCER.
ANTIFRICTION JOURNAL BOX.
No. 494,392.  Patented Mar. 28, 1893.
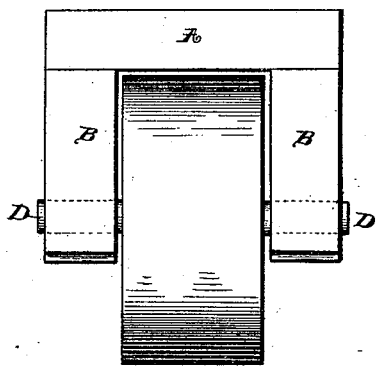
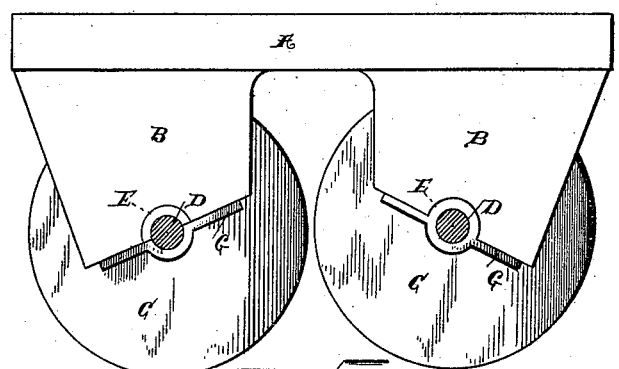
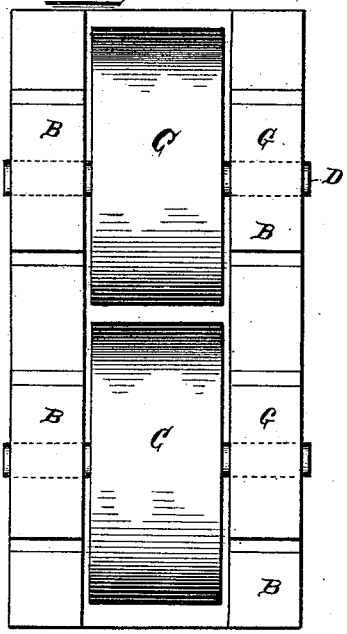
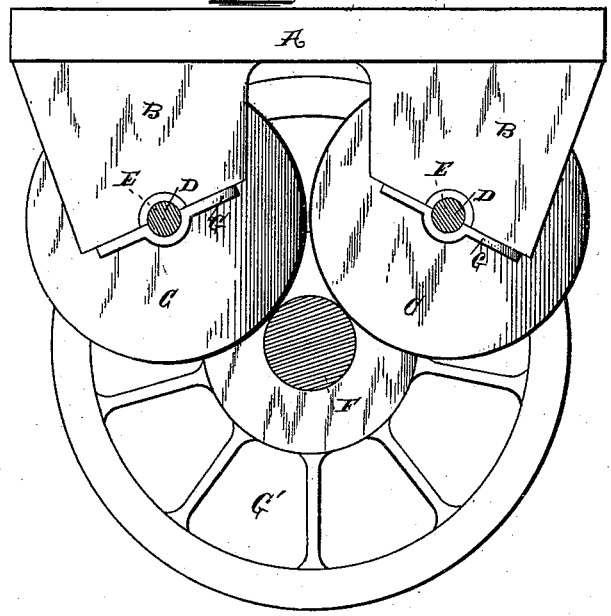
Witnesses
Inventor
George Spencer
By his Attorneys,

UNITED STATES PATENT OFFICE.

GEORGE SPENCER, OF OLD MISSION, IDAHO, ASSIGNOR TO C. W. COLBY, OF SAME PLACE.

ANTIFRICTION JOURNAL-BOX.

SPECIFICATION forming part of Letters Patent No. 494,392, dated March 28, 1893.

Application filed March 30, 1892. Serial No. 427,022. (No model.)

*To all whom it may concern:*

Be it known that I, GEORGE SPENCER, a citizen of the United States, residing at Old Mission, in the county of Kootenai and State of Idaho, have invented certain new and useful Improvements in Antifriction-Bearings; and I do hereby declare that the following is a full, clear, and exact description of the invention, which will enable others skilled in the art to which it appertains to make and use the same.

My invention relates to improvements in bearings for rolling stock, such as cars, &c., and it consists in a certain novel construction and combination of parts, which will be fully described hereinafter and particularly pointed out in the claim.

In the drawings: Figure 1 is a side view of the improved bearing detached. Fig. 2 is a similar view showing a wheel and axle in operative position. Fig. 3 is an edge view. Fig. 4 is a bottom plan view.

The bearing is preferably made in the form of an attachment which is applicable to any ordinary vehicle, and it consists of a plate A provided with twin hangers B B, the lower ends of which are recessed to form half-bearings E E, bearing-plates G G secured to the lower ends of the hangers to complete the bearings E E, and antifriction rolls C C having their spindles D D fitted in said bearings. These rolls operate close together and are adapted to bear upon the axle F, Fig. 2, by which the wheels G' are connected.

The operation of the device will be readily understood. The lower ends of the hangers are inclined upward toward their inner ends or are arranged respectively perpendicular to lines which converge downward and meet beneath the center of the axle F. The thrust upon the hangers is a resultant of two forces, acting respectively, vertical and horizontal, and the lower faces of the hangers are arranged perpendicular to these resultant lines of thrust, so that the thrust acts squarely upon the half bearing therein.

Having described my invention, I claim—

An anti-friction bearing adapted to be interposed between the body of a car and the axles thereof, and comprising the horizontal plate provided at its ends with pairs of downwardly and inwardly inclined hangers, having their lower ends cut at an angle and provided with semi-cylindrical bearing recesses, the two anti-friction rollers arranged between the hangers of each pair and provided with trunnions extending from both faces of each roller and arranged in the bearing recesses, and the bearing plates retaining the trunnions in the bearing recesses, substantially as described.

GEORGE SPENCER.

Witnesses:
HARRY P. WARD,
ISAAC S. DALY.